(12) United States Patent
Gupta

(10) Patent No.: US 6,604,116 B1
(45) Date of Patent: *Aug. 5, 2003

(54) DECREASING MEMORY RETURN LATENCY BY PREDICTING THE ORDER OF COMPLETION OF PARTIALLY READY RETURNS

(75) Inventor: Chandrasekaran Nagesh Gupta, San Jose, CA (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/282,115

(22) Filed: Mar. 31, 1999

(51) Int. Cl.⁷ .............................................. G06F 17/00
(52) U.S. Cl. ........................... 707/200; 707/203; 707/8
(58) Field of Search ....................... 711/133–147, 154, 711/167, 170, 148–153; 707/1–28

(56) References Cited

U.S. PATENT DOCUMENTS

| 4,755,930 | A | | 7/1988 | Wilson, Jr. et al. | |
|---|---|---|---|---|---|
| 6,341,288 | B1 | * | 1/2002 | Yach et al. | 707/100 |
| 6,351,753 | B1 | * | 2/2002 | Jagadish et al. | 707/200 |
| 6,353,877 | B1 | * | 3/2002 | Duncan et al. | 711/133 |

OTHER PUBLICATIONS

Huang et., "A neural–fuzzy classifier for recognition of power quality disturbances", Power Delivery, IEEE Transactions on, vol. 17, Issue 2, Apr. 2002, pp. 609–616.*

Meijster et al., "A comparison of algorithms for connected set openings and closings", Pattern Analysis and Machine Intelligence, IEEE Transactions on, vol. 24, Issue 4, Apr. 2002, pp. 484–494.*

Pendse et al., "Uprating of a single inline memory module", Components and Packaging Technologies, IEEE Transactions on, vol. 25, Issue 2, Jun. 2002, pp. 266–269.*

Archibald, James, et al., "Cache Coherence Protocols: Evaluation Using a Multiprocessor Simulation Model," ACM Transactions on Computer Systems, vol. 4, No. 4, Nov. 1986, pp. 273–298.

Goodman, James R., "Using Cache Memory to Reduce Processor–Memory Traffic," ACM 0149–7111/83/0600/0124, 1983, pp. 124–131.

Papamarcox, Mark S., "A Low–Overhead Coherence Solution for Multiprocessors with Private Cache Memories," IEEE 0194–7111/84/0000/0348, pp. 348–354.

* cited by examiner

Primary Examiner—David Jung

(57) ABSTRACT

The inventive memory controller reduces the latency of memory data returns for memory read request transactions. The memory controller is connected between at least one bus and a memory, with the bus connected to at least two processors. The memory controller examines a storage queue that stores information on the phase status of the transactions to determine whether completed transactions exist, and if not, to predict which partially completed transaction is most likely to become completed next. The memory controller returns the data for completed transactions and sets up the data return for the partially completed transaction that is most likely to become completed next. Multiple read requests may be processed out of order to maximize the memory bus utilization and throughput.

20 Claims, 2 Drawing Sheets

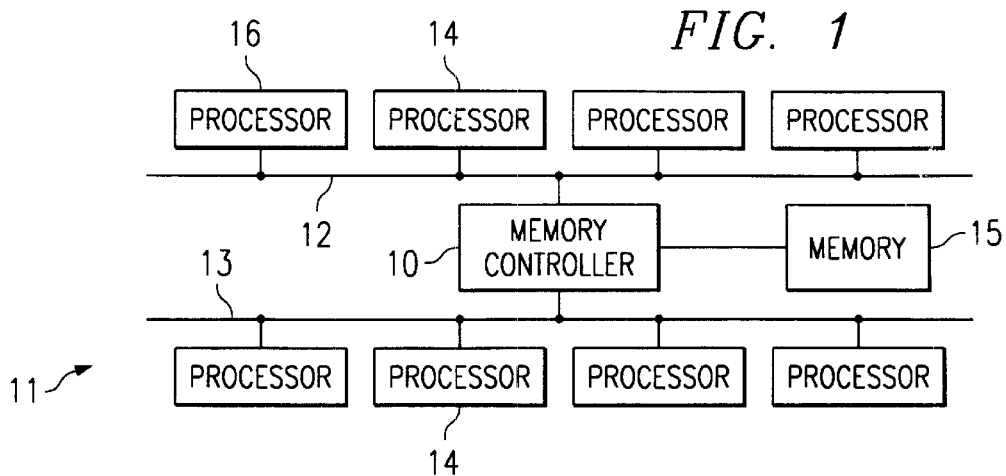
FIG. 1
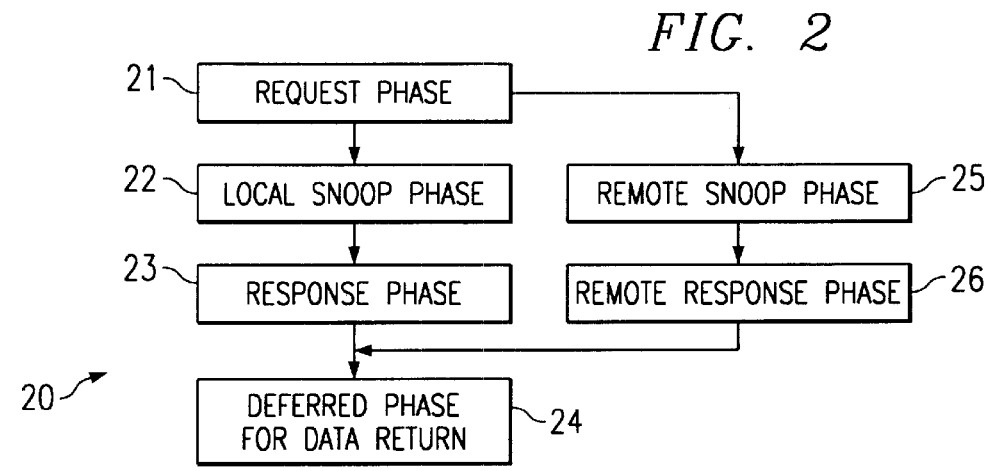
FIG. 2
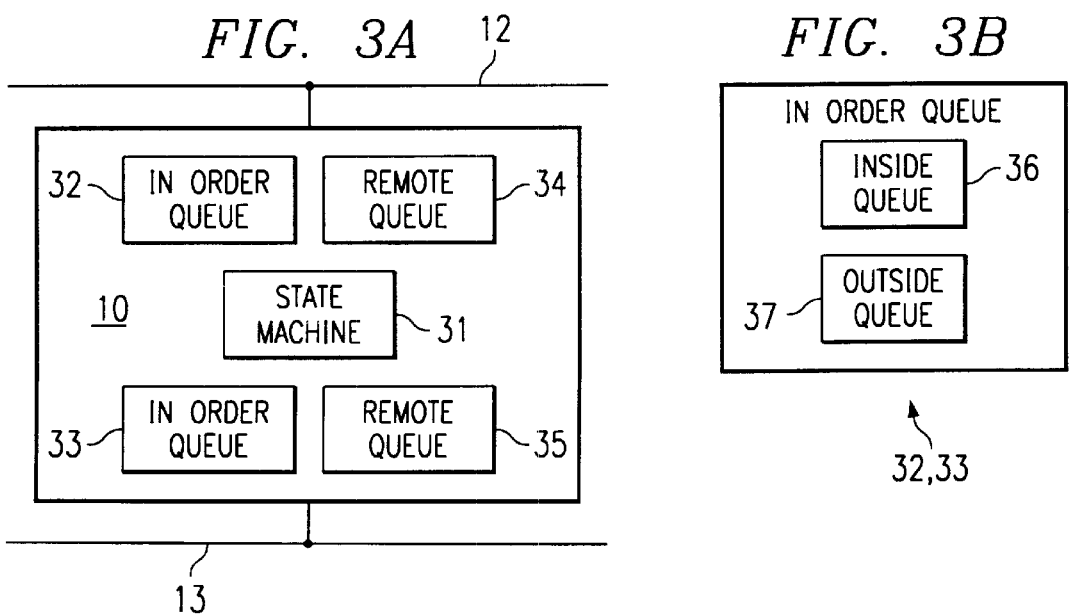
FIG. 3A
FIG. 3B

DECREASING MEMORY RETURN LATENCY BY PREDICTING THE ORDER OF COMPLETION OF PARTIALLY READY RETURNS

BACKGROUND OF THE INVENTION

The different processors of the multiprocessor system typically share access with a common memory. Requests for access to the memory from the processors are routed through a memory controller. The memory controller receives a read request from one of the processors. The memory controller then reads the memory. The memory controller then formats a response to the request that includes the data, and then sends the response back to the requesting processor.

Prior art memory controllers are designed to process requests in order, thus the memory controllers would return a response with the requested data in the same order that the requests for data are received. Some memory controllers also issue read requests to memory in the same order as the corresponding requests are received by the memory controller. Hence, the returns from the memory are also in the same order, causing the request transactions to be always completed in the order in which they were received. The next transaction that will be available to be returned to a processor is clearly known, since the memory controller operates according to the received order of the requests. Consequently, the memory controller can perform preparation operations in anticipation of the returning data from memory.

However, the order requirements of the prior art controllers have several limitations. Servicing the requests in order requires a large amount of queue space. Data received by the memory controller from the memory must be held until the request associated with the data is sequentially the current request. Thus, the data from memory must be queued. This also causes a back log of requests, as requests cannot be satisfied until their associated data is returned. As a further consequence, the prior art controllers experience long latencies, because of the queuing of the requests and the data. Also, since the requests must be processed in a particular order, the requests cannot be re-ordered by the controller to maximize bus utilization and throughput. Thus, the hardware of the system is inefficiently used.

Therefore, there is a need in the art for a memory controller that does not require large amounts of queue space, has reduced request latencies, and can efficiently use the memory bus.

SUMMARY OF THE INVENTION

These and other objects, features and technical advantages are achieved by a system and method that reduces the latency of memory data returns. The invention examines on chip resources to determine whether completed transactions exist, and if not, to predict which partially completed transaction is most likely to become completed next. The invention returns the data for completed transactions and sets up the data return for the partially completed transaction that is most likely to become completed next. Multiple read requests may be processed out of order to maximize the memory bus utilization and throughput. Note that the completed transaction may be returned in an order that is different from the read request order. Also note that the partially completed transaction selected for set up may correspond to a later read request than other pending partially completed transactions. Since transactions are processed out of order, data return latency is reduced.

The invention is a memory controller that is connected between at least one bus and a memory, with the bus connected to at least two processors. Note the inventive memory controller can operate with a single processor, however, the advantages of the invention are realized when the bus has at least two processors. The inventive memory controller manages read requests from the processors. The memory controller fetches the data from memory and checks to see if another processor has ownership of the requested data. If so, the owning processor will respond to the requesting processor. The memory controller includes a storage queue for maintaining information about the pending requests until associated responses have been sent out. A state machine of the memory controller reviews the queue to determine whether any transactions have completed all of their phases. If not, the state machine will determine which of the partially completed transactions is most likely to complete all of its phases, and then will set up this transaction for return. If a different transaction is completed after a partially completed transaction has been set up, the memory controller will cancel the set up, and process the completed transaction. This prevents a deadlock situation from occurring.

The invention can operate with a system having more than one bus, with each bus comprising at least two processors. Thus, when the memory controller checks to see if another processor on the local bus has ownership of the requested data, the memory controller also performs a check on each remote bus. Note that the local bus is the bus that includes the requesting processor, and the remote buses are the remaining buses of the system. Thus, data for a particular transaction in a multiple bus system cannot be returned until both the local and remote checks are completed. The state machine would use a remote queue to track the phases of transaction on remote buses.

The inventive memory controller will batch process completed transactions to avoid forward progress issues. The memory controller uses two sub-queues, i.e. the inside queue and the outside queue, of the storage queue to hold groups of completed transactions. When the inside queue is empty, the contents of outside queue are loaded into the inside queue. The transaction in the inside queue are processed until the inside queue is empty. Any transaction that completed their phase during the processing of the inside queue are loaded into the outside queue. When the inside queue is empty again, the contents of the outside queue is loaded into the inside queue for processing, and the operations begin again. This prevents a completed transaction from being overlooked, in favor of other completed transaction for an extended period of time. Thus, forward progress issues are avoided.

Therefore, it is a technical advantage of the present invention to have a memory controller that reduces the latency in data returns for read request transactions, and thereby improve system performance.

It is another technical advantage of the present invention that requests can originate from multiple processors located on multiple buses.

It is a further technical advantage of the present invention that the memory controller may be implemented in hardware.

It is a still further technical advantage of the present invention that the memory controller can operate without incurring deadlocks and without forward progress issues.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 depicts a block diagram of the inventive memory controller within a system;

FIG. 2 depicts a flowchart of the phases of a read request memory transaction being processed by the memory controller of FIG. 1;

FIGS. 3A and 3B depict block diagrams of the internal structure of the inventive memory controller of FIG. 1;

DESCRIPTION OF THE INVENTION

Figure 4:
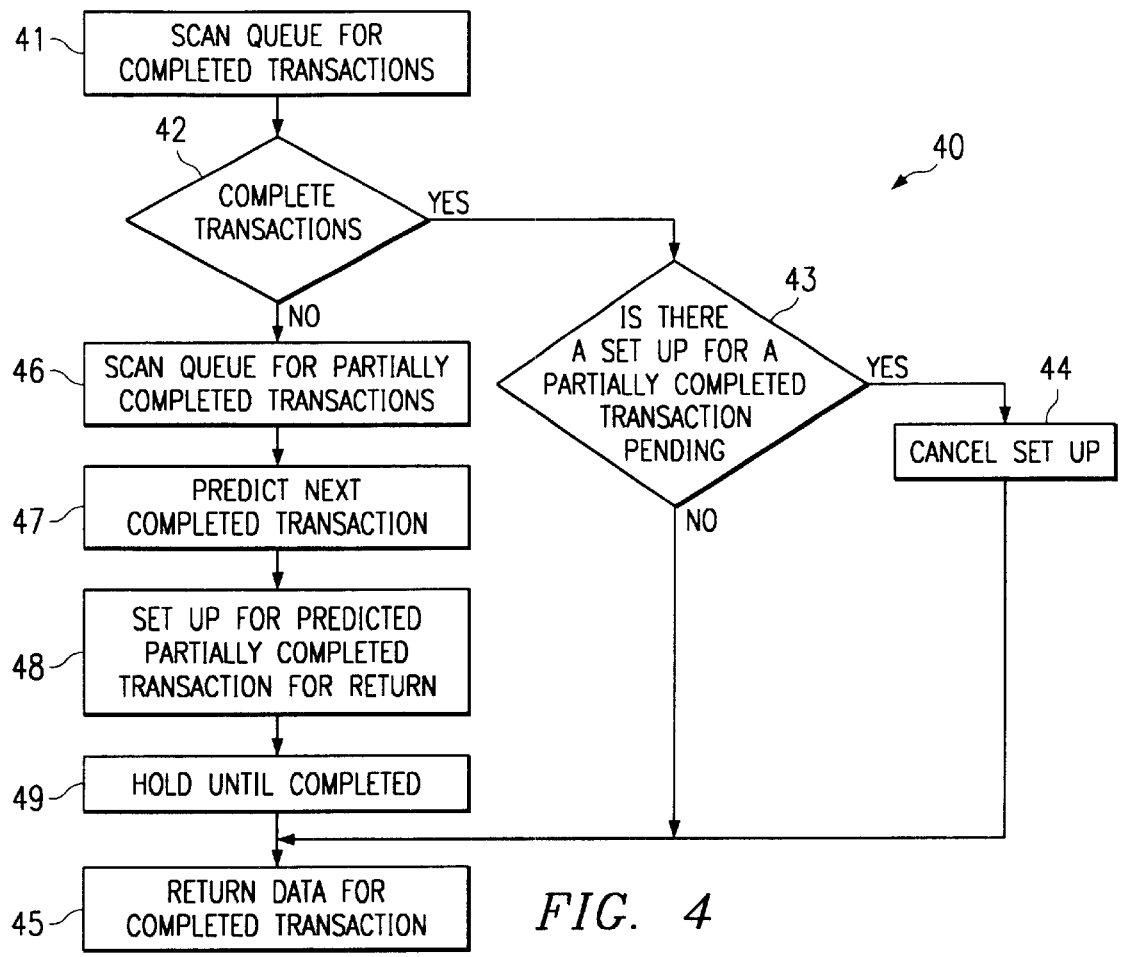
FIG. 4 depicts a flowchart of the operations of the inventive memory controller of FIG. 1.

FIG. 1 depicts the inventive memory controller 10 in system 11. The memory controller is connected to two buses 12, 13. Each bus is connected and is capable of supporting multiple processors 14. Note that the system may have more or less processors connected to each bus. Also, the system 11 may have only one bus or more than two buses. The memory controller 10 manages read requests from the processors 14. The memory controller 10 receives a read request from one of the processors. The memory controller 10 then reads (or writes) the data from (or to) the location specified in the read (or write) request. If such data is at the specified location, the data is sent to memory controller 10, which returns the data to the requesting processor, via a read response. The memory controller also checks to see if another processor has ownership of the requested data. If so, the memory controller will allow the owning processor to respond to the requesting processor. Note that the memory controller 10 also performs other tasks not described herein, such as pre-charging the RAM memory, or writing back data into the memory. Further note that the invention is described in terms of read requests, however the invention can also work with other types of memory operations such as forwarded I/O read data.

The buses 12, 13 support multiple transactions, including multiple read requests. The memory controller 10 includes a storage queue for maintaining information about the pending requests until associated responses have been sent out. The system buses supports split transactions. Thus, the data return for a transaction need not follow the request, but can come in later, after data returns for subsequent transactions. In other words, the data returns need not be in the same order as the data requests. Thus, multiple pending read requests may be processed out of order to maximize the memory bus utilization and throughput. For example, if request A is received from processor 1 and request B is received from processor 2 in that order, then the data for request B may be returned to processor 2 before the data for request A is returned to processor 1. Out of order data return is an important feature, as the memory controller will not hold the bus until the data return is complete. Thus, the bus is free for other transactions. However, note that the bus protocol specification may impose order on some of the different phases of the read request transaction. For example, the buses may be based on MESI protocol (Modified, Exclusive, Shared, Invalid—which are the four states of processor cache), which is an ordered protocol. The MESI protocol is described in Papamarcos, M. S. and Patel, J. H., "A Low Overhead Coherence Solution for Multiprocessors with Private Cache Memories," $11^{th}$ International Symposium on Computer Architecture, 1984, pp. 348–354, Goodman, James R., "Using Cache Memories to Reduce Processor-Memory Traffic," $10^{th}$ International Symposium on Computer Architecture, 1983, pp. 124–131, and Archibald, James and Baer, Jean-Loup, "Cache Coherence Protocols: Evaluation Using a Multiprocessor Simulator," ACM Transactions on Computer Systems, V. 4, No. 4, November 1986, pp. 273–298, each of which are incorporated by reference. Thus, certain phases of the transaction will happen in the same particular order as the data memory requests are seen on the buses, these phases are known as the in-order phases. Data may be returned to the requesting processor after these phases are complete. For this read requests the in-order phases of the transaction are the request phase 21, the snoop phase 22, and response phase 23. Note that other phases may exist before or after these phases, but are not described herein. Further note, the that multiple in-order phases can be pending for different transactions. The in-order phases means that the oldest particular in-order phase will be completed first. In other words, the oldest request phase should complete the response phase first.

FIG. 2 depicts the phases of a read request transaction 20. The transaction begins in the request phase 21. In this phase, the memory controller 10 receives the read request from a processor 14, and stores information about the requested data, e.g. address, and the requesting processor. The memory controller 10 also starts to read the memory. The next phase of the transaction 20 is the snoop phase 22. In this phase, the memory controller determines, via snoop responses of the processors, whether another processor has ownership of the requested data. During the response phase 23, the memory controller 10 collects the responses from the other system bus agents, e.g. I/O controller 514. If the snoop results reveals that another processor has ownership, the memory controller 10 will not use the retrieved data from memory 15, but rather will allow the owning processor to respond to the requesting processor. Otherwise, the memory will return the retrieved data from memory 15 to the requesting processor via a read response in the deferred phase 24. Note that at this point, the data may be returned to the requesting processor, as the response phase is the last of the in-order phases. During the deferred phase 24, the memory controller forms the read response from the retrieved memory data, which will be sent to the requesting processor.

If the system 11 has more than one bus 12,13, then the snoop phase 22 is the local snoop phase, where only the bus of the requesting processor is checked. For example, if processor 16 is the requesting processor, then bus 12 is the local bus, and local snoop phase 22 reviews the processors connected to bus 12 and not bus 13. All other buses would be considered remote buses, e.g. bus 13. The memory controller 10 also initiates a remote snoop phase 25 for each remote bus, by placing a snoop inquiry on each remote bus. The memory controller collects the response to the remote snoop during the remote response phase 26. Data for a particular transaction cannot be returned until remote snoop 25 and local response phases are completed. Therefore, for data to be returned to a requesting processor in a multiple bus system, both the local in-order phases and the remote phases must be completed.

FIG. 3A depicts the internal arrangement of the memory controller 10. State machine 31 tracks the progression of the various transactions through the different phases and updates the information in the queues. The state machine predicts which transaction is mostly likely to complete next, and then based on the prediction, prepares a read response in anticipation of receiving a data return from memory 15. The memory controller 10 uses in-order queue 32 to store information about the transactions as they are going through their various in-order phases on the local bus, i.e. bus 12. The information includes information about the read request identifier, the memory request, memory address information, the local snoop inquiry, and phase completion information. The memory controller 10 uses remote queue 35 to store information about the transactions as they are going through the remote snoop phase and the remote response phase on the remote bus, i.e. bus 13. The information includes information about the read request identifier, the remote snoop inquiry, and phase completion information. Note that the same transactions in the in-order queue 32 also appear in the remote queue 35. The memory controller 10 uses in-order queue 33 to store information about the transactions as they are going through their various in-order phases on the local bus, i.e. bus 13. The information includes information about the read request identifier, the memory request, memory address information, the local snoop inquiry, and phase completion information. The memory controller 10 uses remote queue 3 4 to store information about the transactions as they are going through the remote snoop phase and the remote response phase on the remote bus, i.e. bus 12. The information includes information about the read request identifier, the remote snoop inquiry, and phase completion information. Note that the same transactions in the in-order queue 33 also appear in the remote queue 34. Further note that the inventive aspects of the memory controller are implemented in hardware. As an alternative embodiment, the functions of in-order queue 32 and remote queue 35 may be combined in a single queue, monitoring the both the local and remote phases for transactions originating on bus 12. Similarly, the functions of in-order queue 33 and remote queue 34 may be combined in a single queue, monitoring the both the local and remote phases for transactions originating on bus 13.

FIG. 4 depicts a flowchart of the operations of the inventive memory controller 10. The state machine 31 scans 41 the queues 32, 33, 34, 35 to determine whether any transactions are completed transactions, meaning that the in-order phases are complete (on a single bus system) or both the in-order phases and the remote phases are complete (on a multiple bus system). This scan may be performed on every clock cycle that the system is idle. If there are completed transactions, then the memory controller generates a read response and returns 45 the data to the requesting processor. Each completed transaction is handled in turn. There can be multiple pending data returns at an given point of time. Note that memory controller may return the completed transaction out of order, i.e. a subsequent transaction may be returned before the oldest transaction. This may be done to maximize bus utilization and throughput. If there are no completed transactions that are ready to be returned, the state machine scans 46 the queues for partially completed transactions. Transactions are partly complete if the in-order phases are not complete (on a single bus system), or one or both of the in-order phases and the remote phases are not complete (on a multiple bus system). The state machine then predicts 47 which of the pending partially completed transactions is most likely to be completed next. Note that the inventive aspects of the state machine are implemented in hardware.

In a single bus system, the state machine will select the oldest or first transaction with the in-order response phase pending and the other phases complete as the transaction mostly likely to complete. If there are no transactions with only the response phase pending, the state machine will select the oldest or first transaction with the in-order snoop phase pending and the other phases complete as the transaction mostly likely to complete.

In a multiple bus system following the MESI protocol, the state machine will select the oldest or first transaction with the remote response phase pending and the local in-order phases complete as the transaction mostly likely to complete. If there are no transaction with only the remote response phase pending, the state machine will follow the hierarchy described with respect to the single bus system.

After the state machine selects the partially completed transaction that is most likely to be the next completed transaction, the memory controller sets up 48 the predicted transaction for return to the requesting processor. If the data is known to be available in memory, the data will be retrieved and inserted into the response. The memory controller will request ownership of the data bus. In other words, the memory controller will perform any tasks that can be performed in order to reduce the latency of data returns. The memory controller will then hold 49 the set up until the transaction is completed, i.e. the remote and local phase are completed. When the phase are completed, the memory controller will return 45 the data to the requesting processor.

To avoid deadlock situations, the memory controller will cancel the return set up for a transaction with partly completed phases whenever a different transaction has all of its phases completed. This situation can occur due to the re-ordering of transactions. During scanning the queue 41 for completed transactions, if a completed transaction is detected, the state machine will check 43 to see if there is a set up for a partially completed transaction. If there is a setup, the memory controller will cancel the setup for the partially completed transaction and proceed with forming a setup for the completed transaction. After forming the setup, the memory controller will return 45 the data for the completed transaction.

Thus, the state machine processes the returns as quickly as possible. The state machine determines whether there are any completed transactions and then returns the data for these transactions. The state machine also predicts which partially completed transaction is most likely to complete next, and then sets up the return for this transaction. Note that the transaction that is most likely to complete may not be the oldest transaction in terms of read request. In stead of holding up other completed, transactions (or transaction likely to complete) waiting for the oldest transaction to complete, the inventive memory controller processes the completed transaction a head of the oldest transaction. Therefore, the inventive memory controller reduces latency in returning data for read requests, and thereby increases the performance of the system.

FIG. 3B depicts another aspect of the inventive memory controller. The inventive controller uses two sub-queues in the in-order queues 32,33 to batch process completed transactions, namely the inside queue 36 and the outside queue 37. Batch processing avoids forward progress issues. In other words, the sub-queues prevent an older completed transaction (or orphan transaction) from being left pending, while other, newer completed transactions are processed. When the state machine is in an idle state, e.g. scanning for completed transaction 41 or holding a set up until completion 49, the state machine will copy the identifiers or indices of the pending completed transaction from the outside queue 37 into the inside queue 36. Note that the completed transactions have completed both the local and remote (if any) phases. The memory controller will then begin to return the data for each transaction in the inside queue, starting with the lowest index and going up in index until all the transactions in the inside queue 36 are returned. As the transactions in the inside queue 36 are being processed and the data is being returned, the indices of the newly completed transactions are copied into the outside queue 37 by the state machine. When all of the transactions in the inside queue 36 have been processed, the state machine returns to the idle state, which then allows the state machine to copy the indices from the outside queue 37 into the inside queue 36 and begin processing these transactions. This operation is repeated until all pending completed transactions have been completed, at which time, the state machine will process the partially completed transactions in accordance with FIG. 4. Thus, forward progress issues are avoided.

Figure 5:
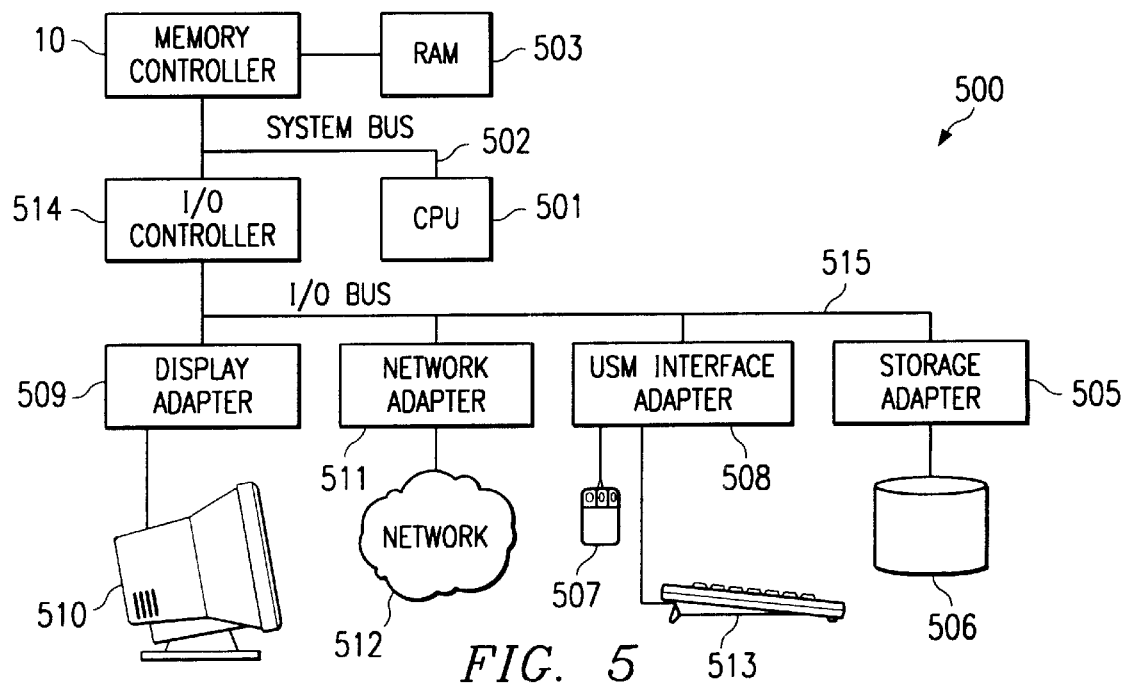
FIG. 5 depicts a high level block diagram of a computer system adapted to implement the inventive memory controller of FIG. 1.

FIG. 5 illustrates computer system 500 adapted to use the present invention. Central processing unit (CPU) 501 is coupled to system bus 502. Note that only one system bus and one processor are shown for simplicity, although the system 500 may include more than one system bus and/or processor, as shown in FIG. 1. In addition, bus 502 is coupled to random access memory (RAM) 503 through memory controller 10, and input/output (I/O) controller 514. The CPU 501 may be any general purpose CPU, such as an HP PA-8200. However, the present invention is not restricted by the architecture of CPU 501 as long as CPU 501 supports the inventive operations as described herein. Note, system 500 could include ROM (not shown) may be PROM, EPROM, or EEPROM. Also note, RAM 503 which may be SRAM, DRAM, or SDRAM. RAM 503 and ROM hold user and system data and programs as is well known in the art.

The I/O controller 514 connects various I/O devices to the system bus 502. The various I/O devices are connected to the controller 514 via I/O bus 515, for example computer display 510 via display adapter 509, network (such as a LAN, WAN, Ethernet, or Internet) 512 via network adapter 511, user devices such as pointing device 507 and/or keyboard 513 via user interface adapter 508, and mass storage (such as hard drive, CD drive, floppy disk drive, tape drive) via storage adapter 505.

Although the present invention and its advantages have been described in detail, it should be understood that various changes, substitutions and alterations can be made herein without departing from the spirit and scope of the invention as defined by the appended claims.

What is claimed is:

1. A memory controller for managing memory transactions from a plurality of processors, wherein the memory controller is connected between a memory and at least one bus, the plurality of processors are connected to the one bus, and each transaction originated from a particular processor of the plurality of processors, the memory controller comprising:

a storage queue for storing status information of the memory transactions from the one bus; and a state machine for determining whether any of the transactions are completed transactions based on the status information, and if there are no completed transactions, determines which of the transactions is a partially completed transaction that is most likely to become a completed transaction based on the status information;

wherein if there is at least one completed transaction, then the memory controller forms a response and returns the response to the originating processor; and if there are no completed transactions, the memory controller sets up a response for the partially completed transaction and holds the response until the partially completed transaction becomes a completed transaction.

2. The memory controller of claim 1, wherein the each transaction includes:

a memory phase wherein the memory controller sends a memory request for data from the memory according to the transaction;

a processor phase wherein the memory controller sends a processor request to the processors on the bus to determine that another processor different from the originating processor does not have ownership of data referred to by the transaction; and a response phase wherein the memory controller receives a memory response to the memory request and a processor response to the processor request;

wherein a transaction if complete is each phase is complete, and a transaction is partially complete if at least one phase is incomplete.

3. The memory controller of claim 2, wherein the state machine selects the oldest transaction with the response phase incomplete as the partially completed transaction.

4. The memory controller of claim 2, wherein the at least one bus includes a first bus and a second bus, a portion of the plurality of processors is connected to each of the first bus and the second bus, the transaction originated from a processor on the first bus, and the processor phase is a local processor phase wherein the memory controller sends a first processor request to the processors on the first bus to determine whether a processor has ownership of data referred to by the transaction; wherein each transaction further comprises:

a remote processor phase wherein the memory controller sends a second processor request to the processors on the second bus to determine that a processor does not have ownership of data referred to by the transaction;

wherein during the response phase, the memory controller receives a first processor response to the first processor request and further receives a second processor response to the second processor request.

5. The memory controller of claim 1, wherein:

the memory controller sends a first processor request to the processors on the bus to determine that another processor different from the originating processor does not have ownership of data referred to by the transaction.

6. The memory controller of claim 5, wherein the at least one bus includes a first bus and a second bus, a portion of the plurality of processors is connected to each of the first bus and the second bus, and the first processor request is sent to the first bus, the memory controller further comprising:

a remote queue for storing status information of memory transactions on the second bus, wherein the memory transactions originated from a processor on the first bus;

wherein the memory controller sends a second processor request to the processors on the second bus to determine that a processor does not have ownership of data referred to by the transaction.

7. The memory controller of claim 6, wherein the storage queue is a first storage queue for storing status information of first memory transactions from the first bus, wherein each of the first memory transactions originated from processors on the first bus, and the remote queue is a first remote queue for storing status information of the first memory transactions on the second bus, the memory controller further comprising:

a second storage queue for storing status information of second memory transactions from the second bus, wherein each of the second memory transactions originated from processors on the second bus; and a second remote queue for storing status information of the second memory transactions on the first bus.

8. The memory controller of claim 1, wherein:

if the state machine determines that there is at least one transaction is a completed transaction after the memory controller has set up the response for the partially completed transaction, then the memory controller cancels the set up and forms a response for the completed transaction and returns the response to the originating processor.

9. The memory controller of claim 1, wherein the storage queue comprises:

an inside queue for holding a batch of completed transactions for which the memory controller forms and sends a response for each transaction of the batch; and an outside queue for holding the next batch of completed transactions to be placed into the inside queue.

10. The memory controller of claim 1, wherein the memory transactions are read requests.

11. A method for managing memory transactions from a plurality of processors with a memory controller, wherein the memory controller is connected between a memory and at least one bus, the plurality of processors are connected to the one bus, and each transaction originated from a particular processor of the plurality of processors, the method comprising the steps of:

storing status information of the memory transactions from the one bus in a storage queue;

determining whether any of the transactions are completed transactions based on the status information, via a state machine;

determining, if there are no completed transactions, which of the transactions is a partially completed transaction that is most likely to become a completed transaction based on the status information, via the state machine;

forming a response, if there is at least one completed transaction, for the one completed transaction, and returning the response to the originating processor; and setting up a response, if there are no completed transactions, for the partially completed transaction, and holding the response until the partially completed transaction becomes a completed transaction.

12. The method of claim 11, wherein each transaction includes the steps of:

sending a memory request for data from the memory according to the transaction during a memory phase;

sending a processor request to the processors on the bus to determine that another processor different from the originating processor does not have ownership of data referred to by the transaction during a processor phase; and receiving a memory response to the memory request and a processor response to the processor request during a response phase;

wherein a transaction if complete is each phase is complete, and a transaction is partially complete if at least one phase is incomplete.

13. The method of claim 12, wherein the step of determining which of the transactions is a partially completed transaction comprises the step of:

selecting the oldest transaction with the response phase incomplete as the partially completed transaction, via the state machine.

14. The method of claim 12, wherein the at least one bus includes a first bus and a second bus, a portion of the plurality of processors is connected to each of the first bus and the second bus, the transaction originated from a processor on the first bus, and the processor phase is a local processor phase wherein the memory controller sends a first processor request to the processors on the first bus to determine whether a processor has ownership of data referred to by the transaction; wherein each transaction further comprises the step of:

sending a second processor request to the processors on the second bus to determine that a processor does not have ownership of data referred to by the transaction during a remote phase;

wherein during the response phase, the memory controller receives a first processor response to the first processor request and further receives a second processor response to the second processor request.

15. The method of claim 11, further comprising the step of:

sending a first processor request to the processors on the bus to determine that another processor different from the originating processor does not have ownership of data referred to by the transaction.

16. The method of claim 15, wherein the at least one bus includes a first bus and a second bus, a portion of the plurality of processors is connected to each of the first bus and the second bus, and the first processor request is sent to the first bus, the method further comprising the step of:

storing status information of memory transactions on the second bus, wherein the memory transactions originated from a processor on the first bus on a remote queue; and sending a second processor request to the processors on the second bus to determine that a processor does not have ownership of data referred to by the transaction.

17. The method of claim 16, wherein the storage queue is a first storage queue for storing status information of first memory transactions from the first bus, wherein each of the first memory transactions originated from processors on the first bus, and the remote queue is a first remote queue for storing status information of the first memory transactions on the second bus, the method further comprising the steps of:

storing status information of second memory transactions from the second bus, wherein each of the second memory transactions originated from processors on the second bus on a second storage queue; and storing status information of the second memory transactions on the first bus on a second remote queue.

18. The method of claim 11, further comprising the steps of:

canceling the set up for the partially completed transaction, if another transaction is subsequently determined to be a completed transaction; and forming a response for the completed transaction, and returning the response to the originating processor.

19. The method of claim 11, further comprising the steps of:

holding a batch of completed transactions for which the memory controller forms and sends a response for each transaction of the batch, on an inside queue of the storage queue; and holding the next batch of completed transactions to be placed into the inside queue, on an outside queue of the storage queue.

20. The method of claim 11, wherein the memory transactions are read requests.

* * * * *

UNITED STATES PATENT AND TRADEMARK OFFICE
CERTIFICATE OF CORRECTION

PATENT NO. : 6,604,116 B1
DATED : August 5, 2003
INVENTOR(S) : Chandrasekaran Nagesh Gupta It is certified that error appears in the above-identified patent and that said Letters Patent is hereby corrected as shown below:

<u>Column 10,</u>
Line 59, after "wherein a transaction" delete "if" and insert therefor -- is --
Line 59, before "each phrase" delete "is" and insert therefor -- if --

Signed and Sealed this

Nineteenth Day of October, 2004

JON W. DUDAS
*Director of the United States Patent and Trademark Office*